United States Patent [19]
Sano et al.

[11] Patent Number: 4,782,356
[45] Date of Patent: Nov. 1, 1988

[54] AUTOMATIC FOCUSING APPARATUS

[75] Inventors: Kenji Sano; Hironobu Satoh; Takesuke Maruyama; Takanori Hisada; Takashi Azumi, all of Yokohama, Japan

[73] Assignee: Hitachi, Ltd., Tokyo, Japan

[21] Appl. No.: 98,384

[22] Filed: Sep. 18, 1987

[30] Foreign Application Priority Data

Sep. 19, 1986 [JP] Japan ................................ 61-219371

[51] Int. Cl.⁴ .............................................. G03B 3/00
[52] U.S. Cl. ..................................... 354/403; 354/404
[58] Field of Search ............... 354/403, 404, 405, 408; 250/201 AF

[56] References Cited

U.S. PATENT DOCUMENTS 4,383,168  5/1983  Luck, Jr. ...................... 250/201 AF
4,459,004  7/1984  Morizumi ........................... 354/403

FOREIGN PATENT DOCUMENTS 32747  10/1970  Japan .
 28500   8/1971  Japan .
159517  10/1983  Japan .
124912   6/1986  Japan .

Primary Examiner—W. B. Perkey
Attorney, Agent, or Firm—Antonelli, Terry & Wands

[57] ABSTRACT

An automatic focusing apparatus configured such that a projected light from a light emitting element is reflected on an object and the reflection light is passed through a flat plate so as to be received by a light receiving element. The position where the reflection light is received on the light receiving element varies depending on the distance between the apparatus and the object. This positional variation is corrected so as to receive the reflection light at the same position by changing an angle of inclination of the flat plate. A focusing lens is moved in cooperation with the adjustment of the inclination angle of the flat plate, thereby achieving the automatic focusing operation.

6 Claims, 4 Drawing Sheets

FIG. 1
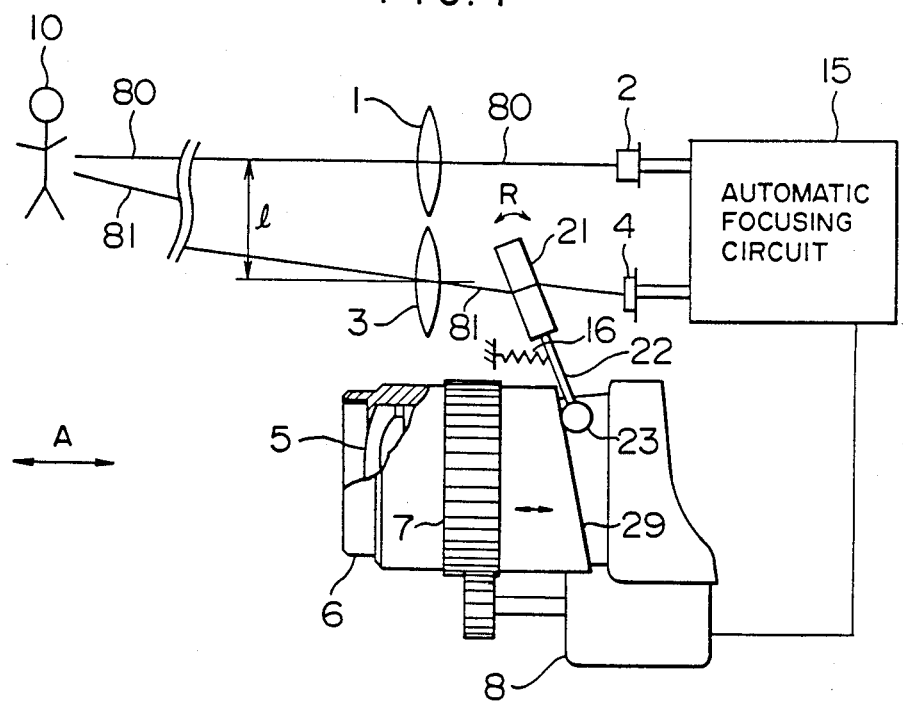
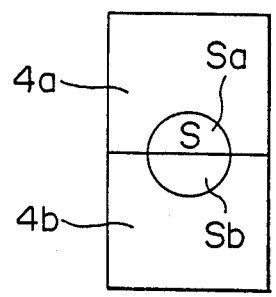
FIG. 2(a)
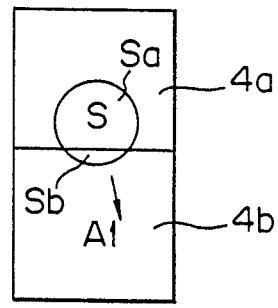
FIG. 2(b)

AUTOMATIC FOCUSING APPARATUS

BACKGROUND OF THE INVENTION

The present invention relates to an automatic focusing apparatus for use with a video camera or the like.

Today, many video cameras or the like for family use are provided with an automatic focusing apparatus to automatically establish a focused image of an object. In such an automatic focusing apparatus, a distance between the object and the camera is measured; and based on the obtained distance, the location of the focusing lens at the moment with respect to the position where the focused image of the object is attained is detected. Depending on the result thus detected, the focusing lens is driven by a driving system such as a motor so as to be moved to the position associated with the best focus.

Apparatuses for detecting the distance between the object and the camera have been incidentally described in the JP-A-45-32747, JP-A-46-285000, and JP-A-58-159517, for example. All of these apparatuses to detect the distance operate by use of light. That is, such an apparatus includes a light emitting section having a projection lens and a light emitting element and a light receiving section having a light receiving lens and a light receiving element. A light emitted from the light emitting section is radiated onto an object, which reflects the light to be received by the light receiving section, thereby determining the distance between the apparatus and the object depending on the light reception state associated with the reflected light received by the light receiving section. The focusing lens is moved thereafter depending on the light reception state of the reflected light from the object. Namely, the light reception state on the light receiving element varies according to the distance of the object. Consequently, the focusing lens is moved to set the light reception state of the reflected light from the object on the light receiving element to a particular state and the distance from the apparatus to the object is measured depending on the distance traveled by the light receiving section. As a result, even when the object is located at an arbitrary distance from the apparatus, if the focusing lens is found at a position of the best focus, the light reception state of the light receiving element is kept remained in the particular fixed state.

In the conventional automatic focusing apparatuses, the light receiving element undergoes a parallel displacement or a reflection mirror is rotated to keep the fixed light reception state of the light receiving element so as to detect the distance of movement of the light receiving element or the angle of rotation of the reflection mirror, thereby moving the focusing lens to the position associated with the focused object according to the distance or the angle thus detected. As a consequence, the accuracy of the determination of the position to which the focusing lens is to be moved depends on the distance of movement of the light receiving element and the magnitude of the rotation angle of the reflection mirror. Incidentally, the method in which the reflection mirror is rotated is attended with a disadvantage that the accuracy of the focusing operation is low because of the small angle of rotation of the reflection mirror. On the other hand, in the method in which the light receiving element is moved, the distance of movement of the light receiving element must be increased to improve the focusing accuracy, thereby leading to a disadvantage that the size of the apparatus becomes greater. Furthermore, the light receiving element must be so configured to be movable and to have an initial position adjustable, which leads to a disadvantage that the structure is complicated.

The automatic focusing apparatus according to the present invention is constituted as follows. That is, a light receiving element is mounted in a mechanism in which the initial position is set. After the initial position is established, the light receiving element is fixed on the mechanism. Between the light receiving element and the light receiving lens, there is disposed a flat plate which is rotatable about an axis orthogonal to a plane including an optical axis of the light receiving lens and an optical axis of the projection lens and which allows light irradiated from the light emitting element to pass therethrough. The light radiated from the light emitting element is reflected on the object and the reflected light is refracted when passing through the flat plate. The refracted light enters the light receiving element. If the flat plate is absent, the position where the light enters the light receiving element varies depending on the distance between the apparatus and the object. As a consequence, to attain a constant light reception state in the light receiving element regardless of the distance, the angle of inclination of the flat plate is adjusted. This is because the magnitude of the refraction of the light varies depending on the magnitude of the angle of inclination of the flat plate. As a result, the angle of the flat plate changes according to the distance between the object and the apparatus, which is therefore configured such that the position of the focusing lens is adjusted depending on the angle of inclination of the flat plate, thereby accomplishing the automatic focusing operation.

SUMMARY OF THE INVENTION

It is therefore an object of the present invention to provide an automatic focusing apparatus having a high accuracy.

Another object of the present invention is to provide an automatic focusing apparatus having a simple structure.

Still another object of the present invention is to provide an automatic focusing apparatus which can be easily assembled.

BRIEF DESCRIPTION OF THE DRAWINGS

The present invention will be apparent from the following detailed description taken in conjunction with the accompanying drawings in which:

FIG. 1 is a schematic diagram showing an embodiment of the automatic focusing apparatus according to the present invention;

FIG. 2(a) is a schematic diagram illustrating light reception in a focused condition;

FIG. 2(b) illustrates the light reception state under a de-focused condition;

DESCRIPTION OF THE PREFERRED EMBODIMENTS

Figure 3:
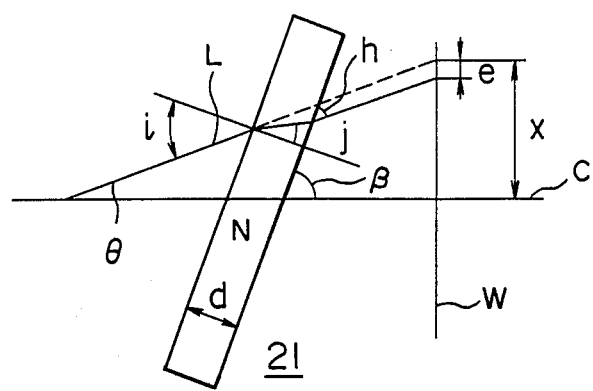
FIG. 3 is a schematic diagram showing a refracted state of a light in a flat plate.

Embodiments of the present invention will now be described with reference to the drawings.

FIG. 1 is a schematic diagram illustrating the configuration of an embodiment of the automatic focusing apparatus according to the present invention. A light beam 80 radiated from a light emitting element 2 passes through a projection lens 1 so as to be reflected on an object 10. A reflected light 81 from the object 10 passes through a light receiving lens 3 and a flat plate 21 and is then received by a light receiving element 4. As shown in FIG. 1, when passing through the flat plate 21, the light beam 81 is refracted and undergoes a parallel displacement in the vertical direction depending on an angle of inclination of the flat plate 21 and is then received by the light receiving element 4. The flat plate 21 is mounted on a fulcrum located at an intersection between the optical axis of the light receiving lens 3 and the flat plate 21 so as to be rotatable in the direction indicated by an arrow mark in FIG. 1.

A function of the flat plate 21 will be here described with reference to FIG. 3. In this diagram, assume that the flat plate 21 is disposed with an inclination of $\beta$ degrees with respect to the optical axis of the light receiving lens 3 and that the refractive index and thickness of the flat plate are N and $\alpha$, respectively. An incident light L entering the flat plate 21 with an angle $\theta$ with respect to an optical axis C is refracted in the flat plate 21. As compared with a position in a case where the flat plate 21 is absent, the position where the refracted light enters a light receiving surface W is shifted by a distance e, which is attained as follows.

$$e = h(\sin\beta - \cos\beta\tan\beta) \ldots \quad (3)$$

where,
$h = d(\tan i - \tan j)$
$i = \theta + 90° - \beta$
$\sin i = N \sin j$.

In this fomula, i stands for an incident angle with respect to the flat plate 21 of the light L radiated on the flat plate 21 and j indicates a refraction angle.

From the fomula above, the quantity of positional shift e is a value determined by the refractive index N of the flat plate 21, the thickness d thereof, the angle $\theta$ with respect to the optical axis C of the light C incident to the flat plate 21, and the angle $\beta$ of inclination of the flat plate 21 with respect to the optical axis C. The refractive index N and the thickness of the flat plate 21 are determined by the material and the dimensions of the shape, respectively; whereas the value of the angle $\theta$ is determined by the distance between the object and the apparatus and the distance ( (base line length) between the axes of the projection lens 1 and the light receiving lens 3. Consequently, the amount of shift e is determined by the inclination $\beta$ [of the flat plate 21.

For example, under conditions of the distance between the object 10 and the apparatus = 1 m, the base line length = 25 mm, the focal distance f of the light receiving lens 3 = 30 mm, the refractive index N of the flat plate 21 = 1.5168, and the thickness d thereof = 3 mm, if the flat plate 21 is absent, the light receiving position on the light receiving plane R is shifted by x from the optical axis C as follows.

$x = fl/y$

That is, x=0.75 mm results. The shift of the light receiving position is compensated for by means of the flat plate 21, namely, the angle of inclination $\beta$ of the flat plate 21 is set so that the light 81 enters the light receiving plane R on the optical axis C. Assuming e=0.75 mm in the expression (3), the angle $\beta$ is determined to be 54.7°, which indicates the flat plate 21 to be inclined by 54.7° with respect to the optical axis 81.

In a case where the distance between the object 10 and the apparatus is infinite, the light beam 81 is considered to proceed along the optical axis of the light receiving lens 3. As a result, the angle of inclination $\beta$ of the flat plate 21 is obtained as $\beta = 90°$.

Consequently, when the distance of the object 10 is to be measured in a range from 1 m to the infinite, the angle $\beta$ of the flat plate 21 with respect to the optical axis C varies in a range from 54.7° to 90°.

Incidentally, the angle of rotation $90° - \beta$ of the flat plate 21 changes depending on the base line length ( and the thickness d of the flat plate 21. That is, even when the base line length ( is decreased, if the thickness d of the flat plate 21 is reduced, the rotation angle can be kept unchanged.

A concrete example will now be described. For the base line length l=50 mm and the thickness d of the flat plate 21=3 mm with the remaining conditions identical to those described above, the angle of rotation of the flat plate 21 is attained as $90° - \beta = 56.2°$. Next, under conditions of the thickness d of the flat plate 21=3 mm and the base line length l=25 mm, the rotation angle of the flat plate is determined as 35.4°. However, in a case where the base line length l=25 mm and the thickness d of the flat plate 21=2 mm, the angle of rotation is increased to 47.4°.

As described above, even when the base line length ( is reduced, if the thickness d of the flat plate 21 becomes smaller, the angle of rotation $\beta$ of the flat plate 21 is increased. As a result, even when the automatic focusing apparatus is minituarized, the distance can be measured with a high accuracy.

The operation of the configuration will now be described with reference to FIG. 1. The light beam 81 that has passed through the flat plate 21 is received by the light receiving element 4. The light receiving element 4 has been fixed after the initial position is established.

FIG. 2 shows light reception states of the light 81 on the light receiving element 4 in which FIG. 2(a) corresponds to a light reception state of the light 81 in a focused condition. The light receiving element 4 includes two light receiving elements 4a and 4b, namely, is a 2-part light receiving element. In this embodiment, since a light spot of the light emitting element 2 is formed in a circular shape, a projection light 80 projected on the object 10 has also a circular shape. As a consequence, the reception light 81 is also configured in a circular shape on the light receiving element 4 receiving the reflection light 81 from the object 10. In the focused situation, as shown in FIG. 2(a), the beam spot S is received by two light receiving elements 4a and 4b, the spot S being equally divided into two portions thereon. Under a defocused condition, as shown in FIG. 2(b), a larger portion of the divided portions is received by the light receiving element 4b, which therefore absorbing a greater amount of light. In this case, the angle of rotation 8 of the flat plate 21 is so adjusted to move the beam spot S in the direction indicated by A1, thereby obtaining the state of FIG. 2(a). Furthermore, the beam spot S need not be formed in a circular shape, namely, the beam spot S need only be symmetric with respect to the direction to divide the light receiving element 4.

A description will now be given of the driving section to drive the focusing lens 5 and the flat plate 21. In a case where the light beam 81 enters the light receiving element 4 in a situation shown in FIG. 2(b), the automatic focusing circuit 5 detects the difference between the amounts of light incident to the light receiving elements 4a and 4b, respectively. Thereafter, the automatic focusing circuit 15 drives the motor 8 depending on the difference between the amounts of light received by the light receiving elements 4a and 4b. When the motor 8 is driven, a motor gear 8a installed on a power shaft of the motor 8 is caused to rotate and then a gear 7 is turned. Since the gear 7 and a focus ring 6 are configured to be integral with each other, the focus ring 6 is also rotated. The focusing lens 5 is retained on the focus ring 6. In addition, the focus ring 6 is linked to a fixed cylinder (not shown) of the body of the zoom lens by means of a helicoid screw (not shown). When the focus ring 6 rotates, the focus ring 6 moves along the lead of the helicoid screw in the direction of the optical axis A. On the other hand, cam follower 23 is mounted via lever 22 on the flat plate 21. The cam follower 23 is kept pressed against an end surface (cam surface) 29 of the focus ring 6 by means of an elastic member 16. When the focus ring 6 rotates and moves at the same time in the direction of the optical axis A, the cam follower 23 moves via a cam surface 29 in the direction of the optical axis A. As the cam follower 23 moves, the flat plate 21 is rotated so as to change the angle of inclination $\beta$ of the flat plate 21 with respect to the optical axis C. That is, when the focusing lens 5 is moving toward the focus position, the angle of inclination $\beta$ of the flat plate 21 varies so as to move the position of the beam spot S of FIG. 2(b) in the direction indicated by an arrow mark A1. When the focusing lens 5 is located at the focus position and the beam spot S is moved to the position of FIG. 2(a) in association with the inclination of the flat plate 21, the rotation of the motor 8 is stopped.

That is, the cam face 24 of the focus ring 6 is arranged such that when the focusing lens 5 establishes a focused image of the object 10, the light receiving spot S is balanced on the light receiving element thus divided into two portions.

In this fashion, the focusing lens 5 is moved to the focus position through an automatic operation.

Figure 4:
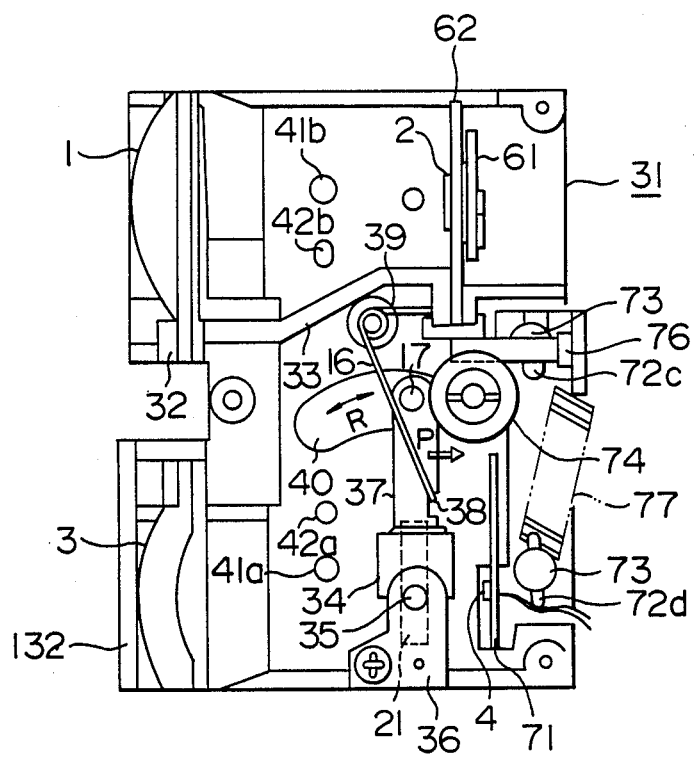
FIG. 4 is a schematic diagram illustrating substantial portions of an embodiment of the automatic focusing apparatus according to the present invention.

FIG. 4 shows a concrete structure of the focusing mechanism section of the automatic focusing apparatus according to the present invention. The configuration of FIG. 4 will now be described. A light 80 radiated from the light emitting element 2 passes through a projection lens 1 so as to be projected onto an object 10. A reflection light 81 reflected from the object 10 passes through a filter 132, a light receiving lens 3, and a flat plate 21 and is then received by a light receiving element 4. The filter 132 here enables only the light from the light emitting element 2 including the components of wavelengths associated with infrared rays to pass therethrough and to prevent the other lights from passing therethrough. That is, only the reception light 81 for the focusing operation passes through the filter 132 and thereafter is received by the light receiving element 4 via the light receiving lens 3 and the flat plate 21. In this operation, as described above, the reception light 81 is deflected by the flat plate 21.

The light receiving section is separated from the light emitting section by a separating section 33. The flat plate 21 is mounted on a holder 34 retaining the flat plate 21. The flat plate 21 rotates about a fulcrum, which is a rotation shaft 35. The rotation shaft 35 is rotatably mounted on a bearing member 36. The flat plate 21 is inclined such that the reflection light 81 from the object 10 enters the light receiving element 4. A lever section 37 is formed integrally with the flat plate holder 34. An elastic member 16 is mounted on a mount pin 39. A portion of the elastic member 16 is engaged with a notch 38 disposed in the lever 37. A cam follower 17 is disposed in the lever section 37. A unit holder 31 is provided with a cam follower escape hole 40. The cam follower 17 is protruded as compared with the cam follower escape hole 40 (in the direction toward the rear side of the sheet of paper). The focus ring 6 on which the focusing lens 5 is mounted, the gear 7, the motor 8, and the like are configured on the rear side of the unit holder 31. The cam follower 17 is connected with the focus ring 6 and the like on the rear side of the unit holder 31. The cam follower 17 cooperates with the focus ring 6 so as to move in the direction of an arrow mark R. The mechanism in which the cam follower 17 moves in cooperation with the focus ring 6 may be so configured, as shown in FIG. 1, that the cam follower 17 is directly pressed against a cam face 29 of the focus ring 6. Furthermore, in the configuration, there may be provided a gear 8a connected to the motor 8 or a gear engaged with the gear 7 and the cam follower 17 is linked to the gear, which enables the focus ring 6 and the cam follower 7 to cooperatively move in association with the drive of the motor 8. In the mechanism described above, the cam follower 17 moves in the direction of the arrow mark R in cooperation with the focus ring 6. This causes the flat plate 21 to be inclined cooperatively with the focus ring 6. The apparatus is configured such that the flat plate 21 is so inclined to locate the beam spot S at a position of FIG. 2(a) when the focusing lens is at the focus position. Incidentally, reference numerals 41a and 41b are screw holes disposed to mount the unit holder 31 on the body of a camera or the like, whereas reference numerals 42a and 42b are holes of positioning pins used to determine a positional relationship between the unit holder 31 and the focus ring 6 and the like.

Figure 5:
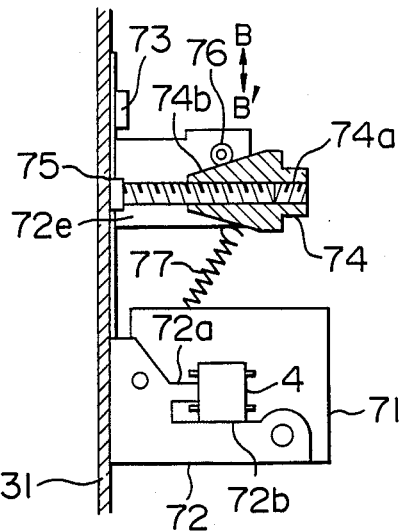
FIG. 5 is a configuration diagram showing a portion of an example of a light receiving element.

FIG. 5 shows the slider section viewed from the direction of the arrow mark P in FIG. 4. The light receiving element 4 is mounted on a board 71, which is in turn retained on a slider 72. The vertical and horizontal positions where the light receiving element 4 is mounted are determined by a projection 72a and a surface 72b of the slider 72, which has guide grooves 72c and 72d disposed therein. The slider 72 is mounted in a unit holder 31 by means of a guide member 73. The slider 72 is movable in the direction of the arrow mark B—B' because of the guide grooves 72c and 72d disposed therein. When the u slider 72 is moved in the direction of A—A' and the mounting position is determined, the slider 72 is fixed at the position, which undergoes a fine adjustment by means of a position adjust means 74 including a screw portion 74a and a tapered portion 74b. The screw portion 74a is linked with a screw 75 disposed in the unit holder 31. A pin 76 is arranged in a fold portion 72e of the slider 72 so as to be brought into contact with the tapered portion 74b. A spring 77 has an end linked to the guide member 73 and another end fixed on the fold portion 72e of the slider 72 so as to push the pin 76 against the tapered portion 74b. When the position adjusting member 74 is rotated and is thus moved along the screw 75, the pin 76 in contact with the tapered portion 74b moves in 0 the direction B—B' and then the slider is moved in the same direction. This enables the fine adjustment of the position of the light receiving element 4 to be accomplished.

As described above, according to the embodiment, the section of the mechanism (section of the slider 72) to adjust the initial setting position of the light receiving element 4 and the section of the mechanism (section of the flat plate 21) to move the flat plate 21 are separately configured, the configuration of the apparatus is simplified. Furthermore, this enables to provide a small-sized automatic focusing apparatus having a high accuracy.

Figure 6:
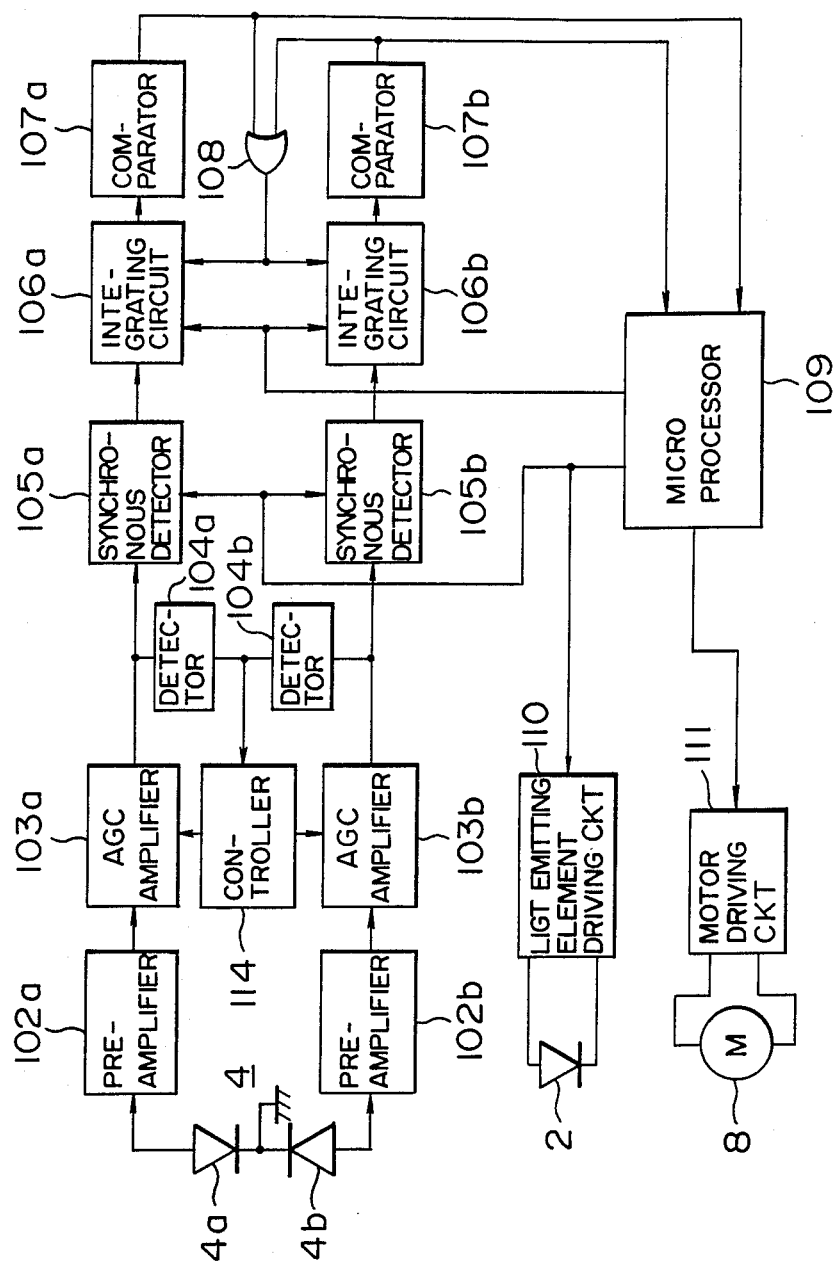
FIG. 6 is a schematic block diagram illustrating an embodiment of the automatic focusing apparatus according to the present invention.

FIG. 6 is a block diagram schematically showing an embodiment of the automatic focusing circuit 15 in which reference numeral 4 indicates a 2-section light receiving element. On receiving light, the respective light receiving sections 4a and 4b of the light receiving element 4 generate electric currents, which are then converted into voltages by means of preamprifiers 102a and 102b, respectively. Reference numerals 103a and 103b designate AGC amplifiers, whereas referencenumerals 104a and 104b indicates detectors to control the respective AGC amplifiers. Reference numeral 114 is a controller which controls the gains of the AGC amplifiers 103a and 103b depending on the greater one of the output signals from the detectors 104a and 104b. Reference numerals 105a and 105b denote synchronous detectors to detect signal components (output signals from the AGC amplifiers 103a and 103b, respectively) of the reflection light from the object 10. The synchronous detectors 105a and 105b deliver output signals to be integrated with respect to time by integrators 106a and 106b, respectively. The results of the integrations are outputted from the integrators 106a and 106b. The output voltages from the integrators 106a and 106b are compared with a reference voltage (not shown) in comparators 107a and 107b, respectively. Output signals from the comparators 107a and 107b are logically added in an OR gate 108, which outputs a result of the addition. The output signal from the OR gate 108 is supplied to the integrators 106a and 106b. For example, when the output signal from the OR gate 108 is "1", the integrators 106a and 106b achieve predetermined integrating operations regardless of the input signal. Output signals from the comparators 107a and 107b are fed to a microprocessor 109, which outputs a synchronization signal, a timing signal, a motor drive signal, and the like depending on the signals supplied thereto. The circuit 110 to drive the light emitting element drives a light emitting element, for example, a light-emitting diode 2 depending on the signals supplied from the microprocessor 109. That is, the light radiated from the light emitting element 2 has undergone a modulation with a synchronization signal generated by the microprocessor 109. The synchronous detectors 105a and 105b are supplied with signals similar to the sinchronization signal fed from the microprocessor 109 to the light emitting element driving circuit 110. Based on the synchronization signal inputted from the microprocessor 109, the received signals are detected by the synchronous detectors 105a and 105b. This configuration enables to discriminate an infrared ray for the measurement which is radiated from the light emitting element 2 and is reflected on the object 10 from an external infrared ray having the same wavelength. The synchronous detectors 105a and 105b output signal components for measurement of the light radiated from the light emitting element 2 and is reflected on the object 10. A combination of the configuration above with the filter 132 through which only the infrared ray for measurement can be passed enables to discriminate the infrared ray for measurement from the natural light.

The motor driving circuit 111 drives the AF motor 8 depending on the signal inputted from the microprocessor 109.

Next, a description will be given of the operation of the automatic focusing circuit shown in FIG. 6.

On receiving light, the light receiving elements 4a and 4b generate signals corresponding to the respective amounts of light received and the signals are then converted into voltages by the preamplifiers 102a and 102b so as to be amplified. The amplified voltages delivered from the preamplifiers 102a and 102b are fed to the AGC amplifiers 103a and 103b respectively. In the AGC amplifiers 103a and 103b, the gains thereof are controlled by a signal inputted via the detectors 104a/104b and the controller 114 such that the signals delivered from the AGC amplifiers 103a and 103b does not saturate by exceeding a predetermined amplitude. The signals inputted from the preamplifiers 102a and 102b - are thus amplified in the AGC amplifiers 103a and 103b, which then deliver the respective amplified signals to be fed to the synchronous detectors 105a and 105b, respectively. In the synchronous detectors 105a and 105b, the signals inputted from the AGC amplifiers 103a and 103b, respectively are subjected to a synchronized detection with a synchronization signal similar to the signal that drives the light emitting element 2. As a result, the signal components for measurement of the light reflected on the object are detected and then the synchronous detectors 105a and 105b output detected signals. The signals outputted from the synchronous detectors 105a and 105b each are quite weak and include high-frequency components, which results in a deteriorated S/N ratio. To overcome this disadvantageous feature, the signals delivered from the synchronous detectors 105a and 105b are integrated by integrators 106a and 106b, respectively. Through the integration in the integrators 106a and 106b, the high-frequency components included therein are averaged with respect to time and become to be zero, and as a result, the detected signal components supplied therefrom include amounts proportional to the time associated with the respective signals.

Thereafter, description will be given of on assumption that the signals attained from the light receiving elements 4a and 4b are processed in the Ach and Bch, respectively.

Figure 7:
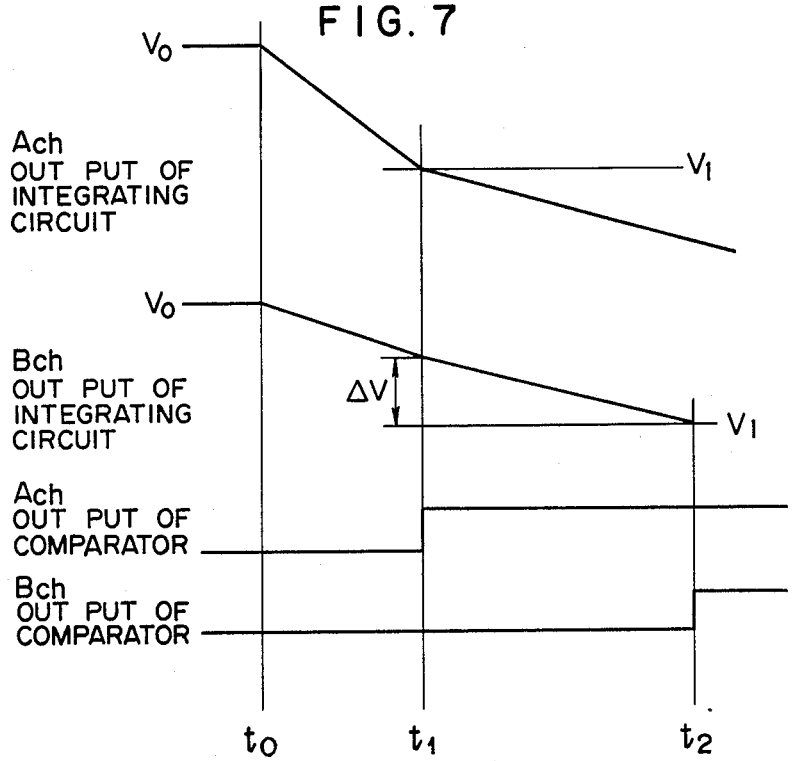
FIG. 7 is a schematic diagram showing waveforms of voltages at respective sections indicating an integrating operation.

In a case where the light reception states of a received light spot are different between the light receiving elements 4a and 4b (the states shown in FIG. 2(b)), signals obtained at respective sections of the circuit block diagram of FIG. 6 develop waveforms as shown in FIG. 7. Namely, the signal waveforms of FIG. 7 correspond to a case where the amount of received light of the light receiving element 4a (Ach) is greater than that of the light received by the light receiving element 4b (Bch). In this situation, as shown in FIG. 7, the time required to reach a reference voltage $V_1$ varies between the output voltages from the integrators 106a and 106b, respectively. If the amount of the received light of the Ach (light receiving element 4a) is greater, the variation in the output voltage from the integrator 106a is greater than that in the output voltage from the integrator 106b. Assume that in the Ach, the output voltage reaches the reference voltage $V_1$ at time $t_1$ after the integration is started at time $t_0$. The condition that the reference voltage $t_1$ is developed at time $t_1$ is then detected by the comparator 107a, which therefore changes the output signal from "0" to "1". The output signal "1" from the comparator 107a is fed via an OR gate 108 to the integrators 106a and 106b. After the signal "1" is received, the integrators 106a and 106b each effect the integrations for a preset period of time. Assume here that the output voltage from the integrator 106b (of the Bch) reaches the reference voltage $V_1$ at time $t_2$. Under this condition, if the integrators 106a and 106b have the same integration characteristics, the time difference $t_2 - t_1$ is proportional to the magnitude of the difference voltage $\Delta V$ between the reference voltage $V_1$ and the output voltage from the integrator 106b (of the Bch) at time $t_1$ Consequently, if the time difference $(t_2 - t_1)$ is measured, the focused state can be judged; furthermore, the plus or minus sign of the difference of time $(t_2 - t_1)$ indicates the direction in which the focused state is shifted. That is, the sign of the difference of time $(t_2 - t_1)$ varies depending on which one of the output voltages from the integrators 106a (Ach) and 106b (Bch) first reaches the reference voltage $V_1$. As a result, the defocusing direction in which the focused state is shifted is judged from the sign of the time difference 1 $t_2 - t_1$, whereas the magnitude of the focus shift or defocused state is determined by the absolute value of the time difference $t_2 - t_1$. The time difference $t_2 - t_1$ is measured and calculated by the microprocessor 109 and then a signal indicating the direction of the rotation of the motor 8 is supplied to the motor drive circuit 111, thereby controlling the operation of the motor 8. After the time $t_2$, the microprocessor 109 sends reset signals to the integrators 106a and 106b to reset the integrators 106a and 106b. In this manner, the focusing operation is effected in the embodiment as described above.

It can be seen from the description above that the focusing accuracy is not deteriorated even when the base line length l is reduced. Furthermore, the mechanism to impart the rotating movement of the focus ring 6 to the flat plate 21 is enabled to be configured in a simple structure. As a consequence, the automatic focusing apparatus as a whole is miniatuarized. In addition, the section of the mechanism to deflect the reflection light 81 from the object 10 and the section of the mechanism to adjust the initial position of the light receiving element 4 are constructed independently of each other. Consequently, the configuration of each mechanism is simplified and the size of the apparatus is minimized. Moreover, the number of parts of the apparatus is decreased, which simplifies the assembly thereof, reduces the assembly error, and improves the assembly accuracy.

While the present invention has been described with reference to the particular illustrative embodiments, it is not restricted by those embodiments but only by the appended claims. It is to be appreciated that those skilled in the art can change and modify the embodiments without departing from the scope and spirit of the invention.

We claim:

1. An automatic focusing apparatus including a light emitting section having an light emitting element and a projecting optical system for projecting a light onto an object, a light receiving section having a light receiving optical system and a light receiving element for receiving reflection light from the object of a projection light projected onto the object, said reflection light being reflected on the object, focusing lens, a lens retaining member for retaining said focusing lens, a lens driven mechanism section for driving said lens retaining member, and control means for controlling said lens driving mechanism section depending on a light reception state on said light receiving element, said focusing lens being driven and controlled to establish a focused image of said object depending on the light reception state of the reflection light comprising:

a light deflecting member disposed between said light receiving optical system and said light receiving element for deflecting said reflection light;

a member holding said light deflecting member for rotational movement about a pivot axis; and light deflecting member drive means for rotating said holding member depending on the light reception state of the reflection light from said object wherein, in order to set the light reception state, on said light receiving element, of the reflection light from said object to a predetermined state, and light deflecting member is rotated by said drive means and said lens retaining member is driven in cooperation with the rotation of said light deflecting member, thereby driving said focusing lens to a position where a focused image of said object is established.

2. An automatic focusing apparatus according to claim 1 wherein said light receiving element is a 2-section light receiving element and said light deflecting member is rotated to establish a predetermined state in which two sections of said 2-section light receiving element equally receive the reflection light from said object.

3. An automatic focusing apparatus according to claim 1 wherein said light deflecting member is a transparent flat plate.

4. An automatic focusing apparatus according to claim 2 wherein said light deflecting member is a transparent flat plate.

5. An automatic focusing apparatus according to claim 2 wherein said control means includes:

a first amplifier for receiving as an input an output signal from one of said two sections of said light receiving element so as to amplify the inputted signal and to output the amplified signal;

a second amplifier for receiving as an input an output signal from the other one of said two sections of said light receiving element so as to amplify the inputted signal and to output the amplified signal;

a first AGC amplifier for receiving as an input an output ignal from said first amplifier so as to amplify the input signal and to output the amplified signal;

a second AGC amplifier for receiving as an input an output signal from said second amplifier so as to amplify the input signal and to output the amplified signal;

a first detector for detecting an output signal from said first AGC amplifier to output a result of the detection;

a second detector for detecting an output signal from said second AGC amplifier to output a result of the detection;

a controller for controlling a gain of said first AGC amplifier and a gain of said second AGC amplifier in response to the output signals from said first and second detectors, respectively;

a first synchronous detector for receiving as inputs a synchronizing signal and an output signal from said first AGC amplifier so as to effect a synchronous detection on the signal supplied from said first AGC amplifier with reference to said synchronization signal and to output a result of the detection;

a second synchronous detector for receiving as inputs a synchronizing signal and an output signal from said second AGC amplifier so as to effect a synchronous detection on the signal supplied from said second AGC amplifier with reference to said synchronization signal and to output a result of the detection;

a first integrator for receiving as an input an output signal from said first synchronous detector so as to integrate the inputted signal and to output an integrated signal;

a second integrator for receiving as an input an output signal from said second synchronous detector so as to integrate the inputted signal and to output an integrated signal;

a first comparator for receiving as an input an output signal from said first integrator so as to compare the inputted signal with a reference voltage and to output a result of the comparison;

a second comparator for receiving as an input an output signal from said second integrator so as to compare the inputted signal with a reference voltage and to output a result of the comparison;

an OR gate for receiving as inputs an output from said first comparator and an output from said second comparator so as to OR the received signals and to supply a result of a logical sum to said first and second integrators; and a microprocessor for receiving as inputs output signals from said first comparator and an output signal from said second comparator, for supplying synchronization signals to said first and second synchronous detectors and a light emitting element drive circuit, and for supplying a control signal to a motor drive circuit in response to the signal inputted from said first comparator and the signal inputted from said second comparator;

said light emitting element drive circuit activating a light emitting element in response to the synchronization signal supplied from said microprocessor;

said motor drive circuit driving said lens drive mechanism section and said light deflection membe drive means in response to the control signal supplied from said microprocessor;

said first and second integrators respectively integrating signals supplied from said first and second synchronous detectors and effecting particular integrating operations after particular signals are respectively supplied thereto from said OR gate.

6. An automatic focusing apparatus according to claim 2, wherein the drive means includes a cam surface secured to move with the lens retaining member, a cam follower secured to said light deflecting member to move along said cam surface and means for pressing the cam follower against said cam surface.

* * * * *